UNITED STATES PATENT OFFICE.

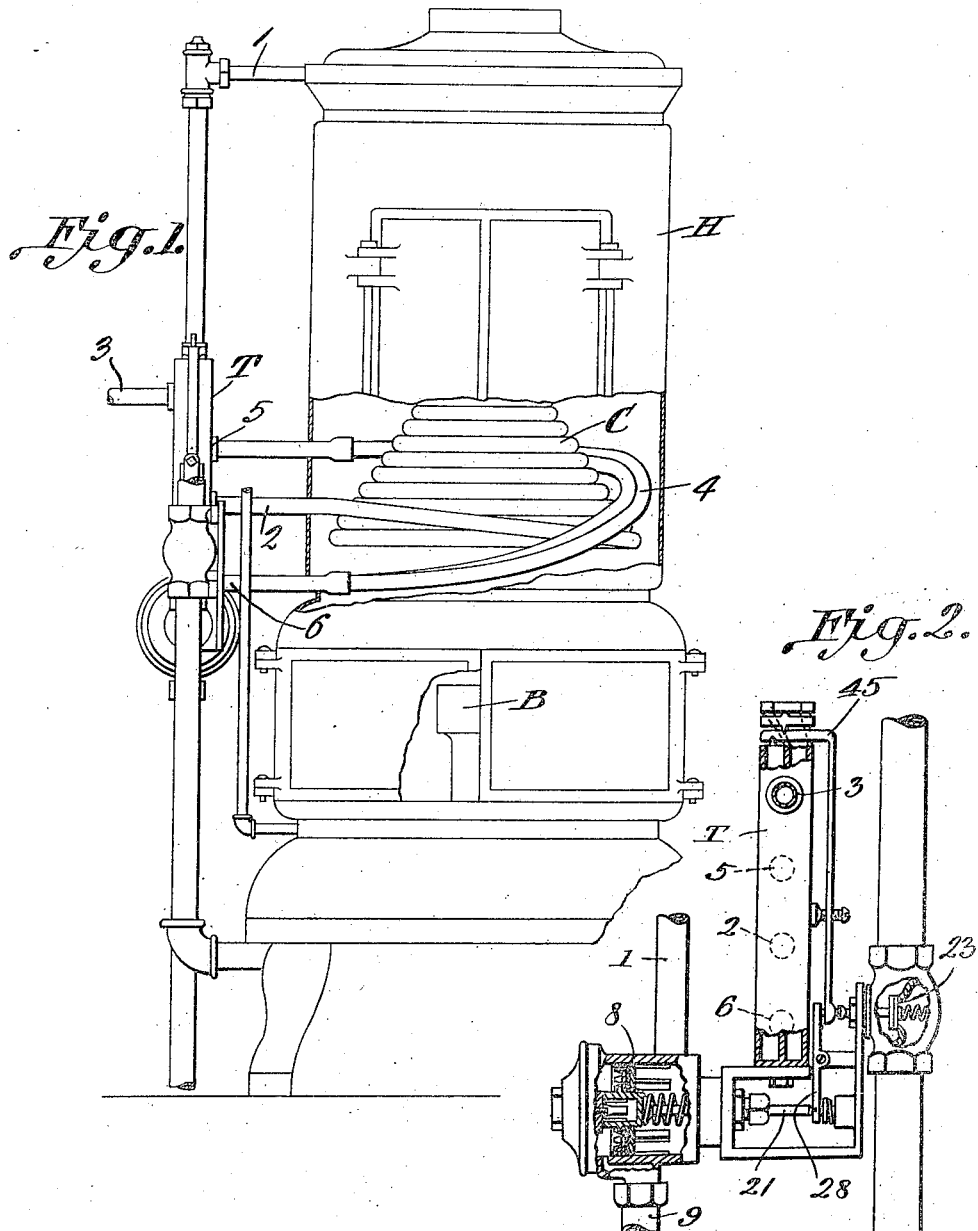

ADOLF BELER, OF PITTSBURGH, PENNSYLVANIA.

THERMOSTATICALLY-CONTROLLED FLUID-HEATER.

1,246,040.　　　　　Specification of Letters Patent.　　Patented Nov. 13, 1917.

Application filed November 12, 1915. Serial No. 61,128.

*To all whom it may concern:*

Be it known that I, ADOLF BELER, a citizen of the United States, residing at Pittsburgh, in the county of Allegheny and State of Pennsylvania, have invented a new and useful Thermostatically-Controlled Fluid-Heater, (Case C,) of which the following is a specification.

This invention relates to fluid heaters of that type utilizing a thermostat for controlling the flow of fuel to the burner of the heater and which employs means under the control of fluid in motion, for opening the fuel supply.

In devices of this character as heretofore devised it has been found that under certain comparatively rare conditions the fluid operated means for opening the fuel supply will become caught or wedged by sediment, by displacement of parts, or as a result of other agencies with the result that when the fluid is turned off at the point of consumption the fuel supply, instead of being likewise cut off will remain open. In some instances, this has resulted in the rapid generation of steam within the water receptacle or coil of the heater.

One of the objects of the present invention is to provide a fluid heater utilizing supplemental means whereby circulation of fluid relative to the thermostat is maintained even after the outflow of fluid has been cut off, thus to direct fluid which has been heated in the coil, to the thermostat where it will render the thermostat active to turn down or entirely extinguish the flame at the burner so that the turning off of the flame is thus made independent of the circulation of fluid set up by the opening of a faucet or other valve in the outflow pipe or conduit of the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing the preferred form of the invention has been shown.

In said drawing:—

Figure 1 is a view partly in elevation and partly in section, showing a fluid heater having the present improvements combined therewith.

Fig. 2 is a view partly in elevation and partly in section of the thermostat and the parts controlled thereby.

Referring to the drawing by characters of reference H designates a heater casing in which is arranged a hot water receptacle which can be in the form of a coil C having a fluid intake pipe or conduit 1 at its upper end and an outflow conduit 2 at its lower end. A burner B is arranged under the fluid receptacle.

Arranged adjacent the heater casing is a thermostat of that type employing a tubular member through which the heated fluid flows upon leaving the coil C while fluid is being drawn from the apparatus. This thermostat has been indicated generally at T and can be of any suitable construction. For example, it can be made as illustrated in Patent No. 1,126,177, issued to me on January 26, 1915. In the structure referred to a fuel controlling valve, indicated generally at 23, is used, this valve being actuated by a lever 28 designed to receive motion from a piston 8 through a stem 21. The piston 8 is held normally in position to close communication between a water supply pipe 9 and the conduit or pipe 1. The piston 8 is held yieldingly in its closed position but when water is caused to flow through the pipe 1, the pressure of water through the supply pipe 9 will be sufficient to unseat the piston. This shifting of the piston will cause stem 21 to operate lever 28 and allow the valve 23 to open. A thermostat including a tubular member T having a high coefficient of expansion is provided and carries a lever 45 designed, when the thermostat is expanded by the hot contents thereof, to shift the valve 23 to its closed position independently of the action of the piston 8.

In controlling mechanism such as described it has been found that under some conditions the piston 8 has become hung or other parts of the mechanism have been rendered inactive for some unexpected reason. Thus after the flow of liquid from the apparatus has stopped, the fluid operated means instead of returning to its normal or initial position, has remained in active position, leaving the fuel controlling valve open for the reason that the heated fluid in the water receptacle or coil C cannot circulate through the thermostat. Consequently steam has been generated and this has often resulted disastrously.

In the drawing, the outflow conduit leading from the thermostat to the point of use has been indicated at 3.

The supplemental coil constituting the present invention can be made up of one or more convolutions extending close to the lower portion of the fluid receptacle or coil C, as shown at 4, one end of this supplemental coil being above the other end and opening into the thermostat T at 5, while the other end of the supplemental coil opens into the lower portion of the thermostat, as shown at 6. Thus it will be seen that when the receptacle C is being heated from the burner B a circulation of fluid will be set up through the supplemental coil 4 and the thermostat T with the result that said thermostat will be rendered active to partly or entirely cut off the supply of fuel to the burner B whether or not fluid is being drawn from coil or receptacle C through the thermostat and the conduit 3.

By providing a supplemental coil such as herein described, generation of steam within the coil or receptacle C and the resultant danger, is avoided and the prompt shutting off of the fuel supply is insured should the temperature of the water within the receptacle or coil C rise above a predetermined degree.

What is claimed is:—

1. A fluid heater including a fluid receptacle having an inlet and an outlet, a burner, a fuel controlling thermostat, means for conducting fluid from the receptacle outlet to the thermostat, said thermostat having an outlet, a fuel controlling valve, means operated by fluid under pressure while circulating through the receptacle to the thermostat and out of the thermostat, for opening said valve, and a normally inactive supplemental means having an inlet and an outlet in communication with the thermostat, for effecting continuous circulation of fluid when heated by the burner, through the thermostat and independently of the action of the pressure operated means.

2. A fluid heater including a fluid receptacle having an inlet and an outlet, a thermostat in communication with said outlet and adapted to be heated by fluid passing from the receptacle to the point of consumption, a burner, a fuel controlling valve, means operated by fluid under pressure flowing into the receptacle, for opening the valve, means operated by the thermostat for closing said valve independently of the action of the pressure operated means, and a normally inactive supplemental means heated by the burner for setting up a constant circulation of heated fluid through the thermostat to automatically close the valve when the temperature of the fluid is raised to a predetermined degree, irrespective of the action of said pressure operated means.

In testimony that I claim the foregoing as my own, I have hereto affixed my signature in the presence of two witnesses.

ADOLF BELER.

Witnesses:
 FRED B. FISHER,
 R. A. TROOP.

Copies of this patent may be obtained for five cents each, by addressing the "Commissioner of Patents, Washington, D. C."